Nov. 26, 1957

H. SAHLIN 2,814,395

APPARATUS FOR HANDLING MATERIALS

Filed April 16, 1954

INVENTOR.
Henry Sahlin.
BY
Elmer Jamison Gray
ATTORNEY.

Nov. 26, 1957
H. SAHLIN
2,814,395
APPARATUS FOR HANDLING MATERIALS
Filed April 16, 1954
3 Sheets-Sheet 2
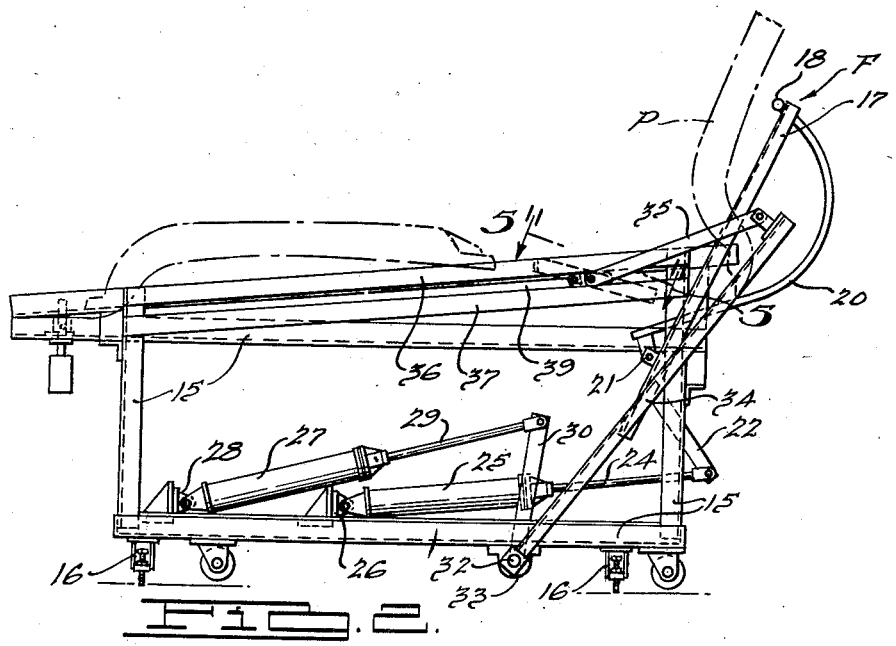
INVENTOR.
Henry Sahlin,
BY
Elmer Jamison Grow
ATTORNEY.

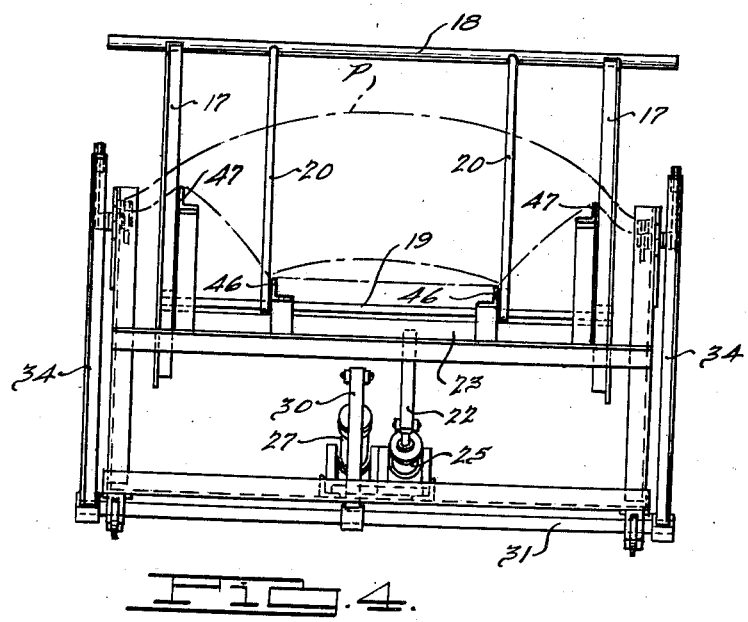

United States Patent Office 2,814,395
Patented Nov. 26, 1957

2,814,395

APPARATUS FOR HANDLING MATERIALS

Henry Sahlin, Birmingham, Mich., Richard T. Sahlin and National Bank of Detroit, executors of said Henry Sahlin, deceased, assignors to Sahlin Engineering Company, Inc., Birmingham, Mich., a corporation of Michigan Application April 16, 1954, Serial No. 423,576

5 Claims. (Cl. 214—1)

This invention relates to an apparatus and method for mechanically handling materials and in particular to a transfer mechanism and method for successively unloading or withdrawing metal stampings, pressed metal panels or other work sheets from a press or machine, inverting the stampings or panels and thereafter loading or feeding the stampings or panels successively into a second press wherein a further operation is performed on the work. As an example of one use to which the invention may be put an automobile body panel may at a first station be stamped or pressed from a sheet metal blank by die operation in a draw press. The stamped panel may then be mechanically unloaded or removed from the press and carried to a second station where the panel is disposed successively in partially and then fully inverted position. Thereafter the panel is fed from the second station to a third station, such as onto the trimming die of a press wherein the edges of the panel are trimmed.

In the particular embodiment of the invention herein illustrated by way of example the preferred means for unloading the work from the stamping or draw press at the first station comprises the swinging pendant or unloading arm of a power operated unloader constructed in accordance with my Patent No. 2,609,776, dated September 9, 1952. The lower end of the pendant arm is provided with fluid actuated jaws for gripping an edge of the panel or work in the stamping press. The pendant arm is operated to raise and swing the work away from the draw press toward the second station. At this second station, which may be termed the pre-load station, there is provided a loading frame, stand or rack carrying means for urging the panel toward inverted position, guiding the panel into fully inverted position at the pre-load station when released by the swinging pendant arm, and thereafter feeding or pushing the panel into the trimming press at the third station.

In accordance with the preferred embodiment there is provided on the loading stand or rack an up and down swingable turn-over cradle or arm device which is preferably operated by fluid actuated means. As the panel is swung outwardly from the draw press and approaches the pre-load station at or near the limit of outward travel of the unloader, i. e. the swinging pendant arm, the cradle is swung upwardly to engage behind the panel and urge the panel to a momentary controlled position of rest wherein the panel assumes a tilted or partially inverted position. The gripping jaws of the unloader are then automatically operated to release the upper edge of the panel whereupon the panel will slide by gravity onto the loading frame into fully inverted or upside down position at the pre-load station.

Also in the present embodiment of the invention there is provided on the loading frame or stand a preferably fluid actuated means, automatically operated in timed relation to the operation of the trim and draw presses, for feeding the inverted panel from the pre-load station into the trim press. The coordinated sequence of operations is controlled through suitable electrical means in turn controlled by a suitable number of primary limit switches.

Other objects of this invention will appear in the following description and appended claims, reference being had to the accompanying drawings forming a part of this specification wherein like reference characters designate corresponding parts in the several views.

Fig. 2 is a side elevation of the loading stand or rack illustrating the swinging cradle or arm device in its up position and the pusher mechanism in retracted position.

Fig. 3 is a side elevation of the loading frame illustrating the pusher mechanism in its forward position and the cradle or arm device in its down position.

Fig. 4 is an end elevation of the loading stand, this view being taken from the right in Fig. 2.

Fig. 5 is an enlarged plan view, partly in section, taken substantially through lines 5—5 of Fig. 2 looking in the direction of the arrows.

Figure 1:
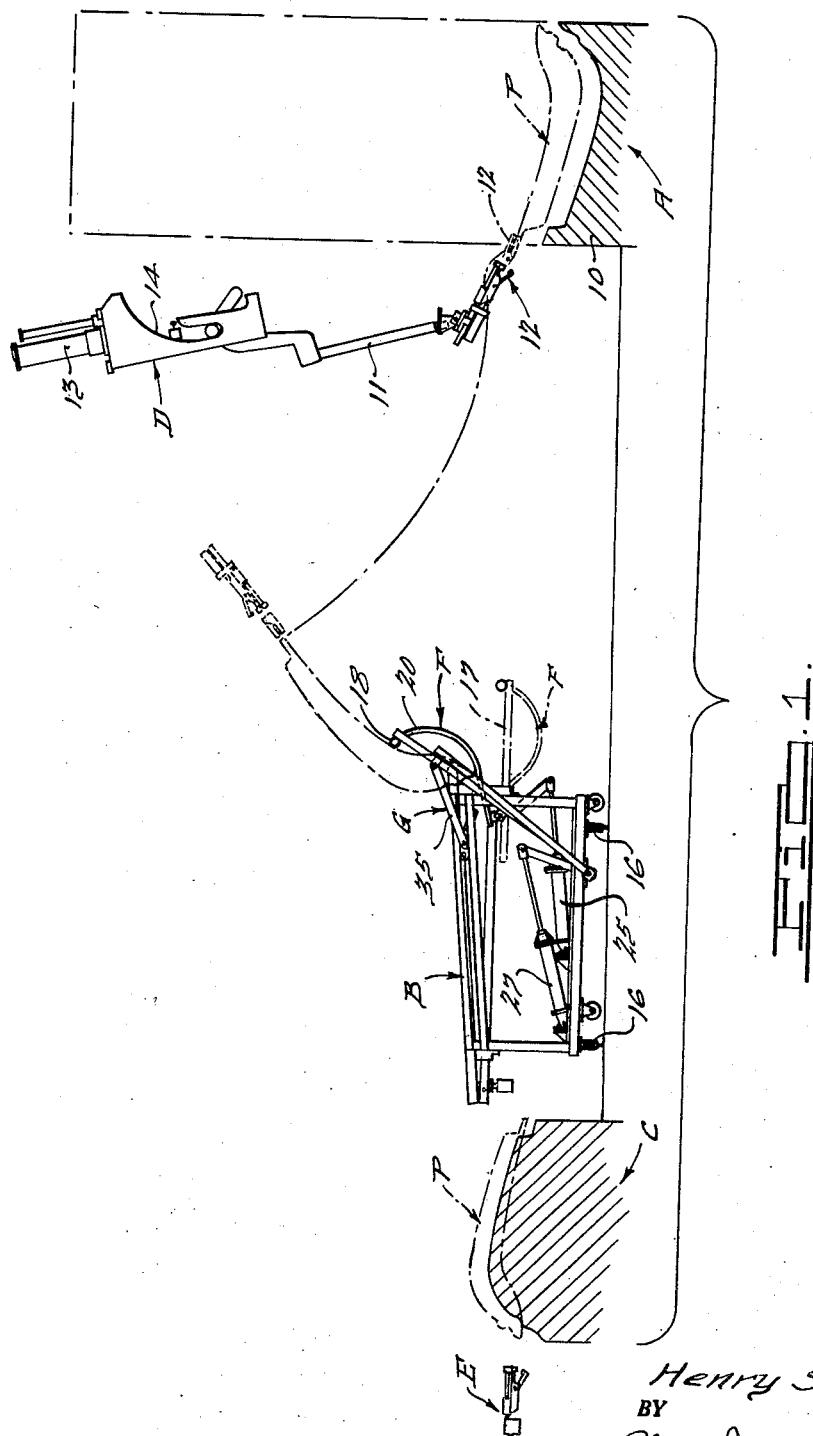
Fig. 1 is largely a diagrammatic view illustrating the method of withdrawing or unloading a panel or work sheet from a press at one station, transferring a work sheet to a loading stand at a second station whence the work sheet is transferred or fed to a second press or machine at a third station.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is illustrated, by way of example, an apparatus by means of which the present method may be carried out. Although the illustrated apparatus employed for the purpose of forming and handling a sheet metal panel, such as the hood or bonnet of an automobile body, it will be understood that the present method is applicable to the handling of various types of panels, stampings and work sheets.

Referring to Fig. 1, there is illustrated at A a machine in the form of a draw press for performing a stamping or draw operation at a first station on a metal sheet to form a panel P. At B there is illustrated a loading frame or rack to which the work sheet P is transferred and turned over or inverted at a second station. At C there is illustrated a second machine, such as a trim press, representing a third station to which the work sheet is transferred from the loading stand at the second station. At D there is illustrated a draw press unloader which is preferably constructed in accordance with the unloading mechanism illustrated in my Patent No. 2,609,776 and which is operated to withdraw the work sheet from the machine at station A and swing it into position at station B. At E there is illustrated a second unloader which is constructed similarly to the unloader D and which operates to remove the work sheet from the machine or trim press C after completion of an operation thereon. Mounted on the unloading stand B is a swinging cradle or arm device F which partially inverts or turns over the work sheet and momentarily supports it in that position. The loading stand B also carries a pusher or feed mechanism G which is operated to propel the work sheet from station B to station C.

The machine or draw press A comprises a conventional lower die 10 with which the usual vertically reciprocating ram of the press cooperates to form the panel or work sheet P. The unloader mechanism D, as more fully shown in my above identified patent, is provided with a swinging pendant or unloading arm 11 carrying gripping jaws 12 adapted to close and grip an edge of the work sheet after completion of an operation at station A. In the unloading operation the pendant arm 11 is shifted vertically, as by fluid pressure means 13, and swung away from the press A through cam means indicated in part at 14. The range of swinging motion of the pendant arm is illustrated in broken lines in Fig. 1.

The loading stand B, which is anchored at the proper location at the second station, comprises a suitable supporting framework 15 composed of various frame members rigidly attached together as illustrated in Figs. 2 to 4. The supporting frame of the loading stand is illustrated as portable and is preferably provided with adjustable legs 16 to station the frame against displacement at the proper location with respect to the first and third stations.

The up and down swinging cradle or arm device, which may also be termed a panel inverting or turn-over device, comprises a pair of transversely spaced outer side frame members 17 connected together at their outer ends by a horizontal transverse bar 18. The frame members or bars 17 adjacent their inner ends are attached to a transverse rock shaft 19. Also attached to this shaft inwardly of the outer frame members 17 are two curved cradle arms or panel guides 20 which are attached at their outer ends to the outer cross bar 18. The rock shaft 19 is pivoted at opposite ends at 21 in suitable bearings carried by the frame so that by turning the rock shaft in one direction or the other the cradle or turn-over device F will swing up and down. Attached to a cross bar connecting the inner ends of the frame members 17 is a crank or lever arm 22. The lower end of this lever arm is pivotally connected to a piston rod 24 carrying a reciprocable piston within an air cylinder 25 which is pivotally connected at one end to a bracket 26 on the frame.

Fluid actuated means is also provided for operating the pusher or feed mechanism carried by the loading stand or rack B. This operating means comprises an air cylinder 27 pivotally connected at one end to a bracket 28 on the frame. The cylinder carries a reciprocating piston to which is attached a piston rod 29 pivotally connected at its outer end to a lever or crank arm 30. The lower end of this lever arm is attached to a transversely extending rock shaft 31 pivotally mounted at opposite ends at 32 in suitable bearings carried by brackets 33 attached to the frame. A pair of upright swinging arms 34 are attached at their lower ends to opposite ends of the rock shaft 31. To the upper end of each arm 34 is pivotally connected a pusher arm 35. Attached to the frame uprights at each side of the loading stand are upper and lower spaced inclined guide bars 36 and 37. The vertical spacing of these guide bars provides a longitudinal guide slot 39 at each side of the loading station.

Referring particularly to Fig. 5, a carriage for each pusher device is provided for travel along the guide bars. This carriage comprises inner and outer plates 38 positioned at opposite sides of the guide bars and carrying therebetween a pair of longitudinally spaced flanged rollers 40 which are adapted to travel along the upper edge of the lower guide bar 37 within the guide slot 39. Each pusher arm 35 at its forward end is pivotally connected to a stud 41 attached to the outer plate 38 of the carriage. A pusher pawl device 42 in the form of a longitudinally extending bar is pivotally mounted on a stud 43 attached to the inner plate 38 of each carriage. The pusher pawl 42 terminates at its forward end in a nose 44 adapted to engage the rear edge of the work sheet for feeding the same from the loading stand into a machine or press. It will be noted that the pusher pawl or bar 42 is pivoted off-center so that the weight of the longer rearward portion of the bar will normally hold the bar in an inclined position as shown in Figs. 2 and 3. A stop or abutment 45 on each inner carriage plate 38 underlies the edge of the pusher bar rearwardly of its pivot so as to hold it in the desired inclined position while at the same time permitting the pusher bar to be tilted away from the stop or abutment.

In the illustrated loading frame structure there are provided, see Fig. 4, a pair of inner longitudinally extending forwardly inclined guide bars 46 for supporting and guiding the front edge of the panel as it slides from an upright position on the cradle to a fully inverted position. These inner guide bars 46 are provided in the present instance since the forward edge of the panel is narrower than the rear edge. However, where the panel is of substantially uniform width, such as in the case of the roof panel of an automobile body, the inner guide bars 46 may be eliminated. In addition to these inner guide bars there are provided two outer longitudinally extending forwardly inclined guide bars 47, Fig. 4, which support and guide the rear wider edge of the panel. Where the panel is of uniform width these outer guide bars are ordinarily sufficient to support and guide the front and rear edges of the panel as it slides into inverted position on the loading stand.

It will be noted that the operations of the unloader D and turn-over or cradle device F are coordinated so as to enable the work sheet to be disposed at the pre-load station B in an upright momentary controlled position of rest and in partially inverted position while suspended by its upper end from the pendant arm 11 of the unloader D. After the work sheet has been withdrawn from press A and swung outwardly by pendant arm 11 to a point at or near the limit of its outward travel, the turn-over device F swings upwardly to cause the curved arms 20 thereof to engage behind the lower portion of the work sheet and push or urge this portion forwardly thereby swinging the sheet into tilted position. As this occurs the lower edge of the sheet can slide along the curved arms 20 until the device F reaches the limit of its upward stroke. By this time the work sheet will have been urged into a tilted position with the upper edge held by the pendant arm and the lower edge resting on the arms 20, such as in the manner shown in Fig. 2. The gripping jaws 12 of the pendant arm 11 are then caused to open, thereby releasing the upper edge of the work sheet. The sheet will then tilt back against bar 18 (see Fig. 1) and slide downwardly by gravity with the front and rear projecting side portions of the sheet sliding along inclined rails 46 and 47 until the sheet comes to rest on the stand B in fully inverted position. As the pusher device G is retracted, after having fed a prior sheet into the trim press, the pusher pawl 42 can pass beneath the inverted sheet on the loading stand since the forward arm of the pawl will contact the underside of the sheet and swing downwardly. Upon clearing the rear end of the sheet the pawl will swing back to normal feeding position as shown in Fig. 2.

An important advantage achieved by virtue of the present invention resides in the elimination of any possibility of marring or damaging the outer surfaces of the work sheet which are exposed surfaces of the automobile that are coated with paint or lacquer. In this connection it will be noted that the turn-over or cradle device engages only the underside of the work sheet and when the sheet slides downwardly into inverted position on the loading stand contact with the underside of the sheet occurs at the edges thereof that are later trimmed off in the trim press.

I claim:

1. A material handling apparatus comprising a loading stand, a swinging unloader arm adapted to grip an edge of a work sheet and to suspend said sheet by said edge over said stand, a turn-over device pivotally mounted on the stand to swing upwardly and downwardly, said device having arm means, means for swinging said device to engage said arm means with the work sheet suspended from said unloader arm and to urge said sheet into partially inverted position, and means on said stand for guiding said work sheet from said turn-over device into inverted position on the stand upon release thereof by said unloader arm.

2. A material handling apparatus comprising a loading stand, a swinging unloader arm adapted to grip an edge of a work sheet and to suspend said sheet by said edge over said stand, a turn-over device pivotally mounted on the stand to swing upwardly and downwardly, said device having curved arm means, means for swinging said device upwardly to engage said arm means with the lower edge of the work sheet suspended from said unloader arm and to urge said sheet into partially inverted position, and inclined guide rails on said stand for guiding said work sheet from said turn-over device into inverted position on the stand upon release thereof by said unloader arm.

3. A material handling apparatus comprising a loading stand, a swinging unloader arm adapted to grip an edge of a work sheet and to suspend said sheet by said edge over said stand, a turn-over device pivotally mounted on the stand to swing upwardly and downwardly about a transverse substantially horizontal axis, said device having arm means, means for swinging said device upwardly to engage said arm means with the lower edge of the work sheet suspended from said unloader arm and to urge said sheet into partially inverted position, means on said stand for guiding said work sheet from said turn-over device into inverted position on the stand upon release thereof by said unloader arm, and means on said stand for propelling the inverted sheet from the stand.

4. A material handling apparatus comprising a loading stand, a swinging unloader arm adapted to grip an edge of a work sheet and to suspend said sheet by said edge above said stand, a turn-over device pivotally mounted on the stand and having guide means, means for swinging said device in the direction toward one side of the suspended work sheet to engage said guide means with said sheet and to urge said sheet in said direction to partially inverted position, and means on said stand cooperable with said guide means to engage said one side upon release of said sheet by said unloader arm and to guide sliding movement of said sheet onto said stand.

5. In a material handling apparatus having a swinging unloader arm adapted to grip an edge of a work sheet and to suspend said sheet by said edge, a loading stand disposed below said sheet when suspended from said arm, a turn-over device pivotally mounted on the stand and having sheet engaging means, means for swinging said device in the direction toward one side of the suspended work sheet to cause said engaging means to engage the sheet and urge it in said direction to partially inverted position, and guide means on said stand engageable with said one side of the sheet upon release thereof by said unloader arm and effective to guide sliding movement of said sheet into inverted position on said stand.

References Cited in the file of this patent
UNITED STATES PATENTS

| | | |
|---|---|---|
| 1,470,533 | Johnston | Oct. 9, 1923 |
| 2,264,826 | Butterfield | Dec. 2, 1941 |
| 2,609,776 | Sahlin | Sept. 9, 1952 |